United States Patent [19]

McVicker

[11] 3,969,267

[45] July 13, 1976

[54] PROCESS FOR REDISPERSION OF NOBLE METAL CATALYSTS USING FLUORINE

[75] Inventor: Gary B. McVicker, Westfield, N.J.

[73] Assignee: Exxon Research and Engineering Company, Linden, N.J.

[22] Filed: Sept. 11, 1974

[21] Appl. No.: 504,862

[52] U.S. Cl. .............................. 252/415; 208/140; 252/442; 252/466 PT; 423/22; 423/489
[51] Int. Cl.$^2$ ................... B01J 23/96; C10G 35/08
[58] Field of Search ..................... 252/415; 208/140

[56] References Cited
UNITED STATES PATENTS

| | | | |
|---|---|---|---|
| 3,764,557 | 10/1973 | Kluksdahl | 252/415 |
| 3,850,747 | 11/1974 | Sinfelt et al. | 208/139 |
| 3,867,280 | 2/1975 | Paynter et al. | 208/140 |
| 3,871,997 | 3/1975 | Sinfelt et al. | 208/139 |

*Primary Examiner*—Winston A. Douglas
*Assistant Examiner*—P. E. Konopka
*Attorney, Agent, or Firm*—Robert J. Baran

[57] ABSTRACT

This invention relates to the treatment of Group VIII, noble metal, catalysts, wherein said noble metal is present on a refractory support and where said noble metal exists as large agglomerated crystallites, e.g., greater than 50 A, which comprises contacting said catalyst with fluorine at a temperature and for a time sufficient to disperse said crystallites to crystallites having substantially smaller particle size. The noble metals which may be dispersed by this process include Pt, Pd, Ru, Ir and Rh. This invention is especially suitable for redispersing iridium-containing catalysts. In a preferred embodiment of the instant invention, an iridium containing reforming catalyst which has become at least partially deactivated because of the presence of carbonaceous deposits is regenerated by contacting, serially, (1) with an oxygen-containing gas at a temperature and for a time sufficient to substantially remove said carbonaceous deposits (2) with hydrogen at a temperature and for a time sufficient to convert said iridium substantially to its metallic form, and (3) with a fluorine-containing gas at a temperature of less than 300°C. for a time sufficient to yield a catalyst wherein the iridium is present in crystallites of relatively small average particle size, e.g., less than 50 A.

6 Claims, No Drawings

PROCESS FOR REDISPERSION OF NOBLE METAL CATALYSTS USING FLUORINE

FIELD OF THE INVENTION

This invention relates to the treatment of Group VIII, noble metal, catalysts, wherein said noble metal is present on a refractory support and where said noble metal exists as large agglomerated crystallites, e.g., greater than 50 A, which comprises contacting said catalyst with fluorine at a temperature and for a time sufficient to disperse said crystallites to crystallites having substantially smaller particle size. The noble metals which may be dispersed by this process include Pt, Pd, Ru, Ir and Rh. This invention is especially suitable for redispersing iridium-containing catalysts. In a preferred embodiment of the instant invention, an iridium containing reforming catalyst which has become at least partially deactivated because of the presence of carbonaceous deposits is regenerated by contacting, serially, (1) with an oxygen-containing gas at a temperature and for a time sufficient to substantially remove said carbonaceous deposits (2) with hydrogen at a temperature and for a time sufficient to convert said iridium substantially to its metallic form, and (3) with a fluorine-containing gas at a temperature of less than 300°C. for a time sufficient to yield a catalyst wherein the iridium is present in crystallites of relatively small average particle size, e.g., less than 50 A.

BACKGROUND OF THE INVENTION

U.S. Pat. No. 3,134,732 teaches that noble metal hydrocarbon conversion catalysts may be reactivated after burning off carbonaceous deposits by contacting with chlorine gas at a temperature of from 60° to 1250°F. for a time sufficient to restore the catalyst to its initial activity. This reference also teaches that fluorine may be used instead of chlorine. However, it is clear that the patentees did not realize the critical parameters which are described hereinbelow in the instant application, which are necessary for the use of fluorine to restore catalyst activity. More particularly, it is clear that the patentees did not recognize that fluorine could not be used to redisperse noble metal catalysts at temperatures of more than 300°C. since at temperatures higher than 300°C. large amounts of fluoride combine with the alumina carrier which is the preferred support taught by the patentee. Furthermore, use of fluorine at temperatures of more than 300°C. reduces the surface area of alumina and also leads to corrosion problems with the reactors used in hydrocarbon conversion processes. Finally, since the patentee's work was limited to platinum, he did not recognize that iridium when contacted with fluorine at temperatures of more than 300°C. is converted into a volatile form and removed from the catalyst.

The importance of metal surface area in noble metal hydrocarbon conversion catalysts, for example, platinum, palladium or rhodium on alumina, has been disclosed in U.S. Pat. No. 3,147,229. Thus, the instant invention, which teaches the use of fluorine to redisperse noble metal hydrocarbon conversion catalysts to a high dispersion level is clearly commercially significant.

U.S. Pat. 3,201,355, also discusses the use of fluorine for regeneration of noble metal catalysts but does not recognize the problems inherent in its use and thus does not teach a fluorine based catalyst regeneration process.

Other disclosures which discuss the use of fluorine as a substitute for the preferred chlorine regeneration of reforming catalysts include U.S. Pat. No. 2,851,398, U.S. Pat. No. 2,906,702, U.S. Pat. 3,573,199 and U.S. Pat. No. 3,654,142. All of these references require temperatures for treating the catalyst of at least 600°F. which, as stated above, is acceptable in chlorine redispersion procedures but is completely unacceptable when fluorine is used as a redispersion agent.

SUMMARY OF THE INVENTION

It has unexpectedly been discovered that fluorine containing gases may be used to regenerate noble metal catalysts by redispersing agglomerated noble metal supported catalysts. In this method, the fluorine is contacted with a noble metal catalyst which is characterized as containing agglomerated crystallites of said noble metal at conditions whereby said crystallites are redispersed into crystallites having a substantially smaller particle size. In general, the use of fluorine admixed with an inert gas as the treating gas is preferred and temperatures of contacting with the noble metal catalyst must be maintained below 300°C. Preferably, the temperature of redispersion with the fluorine treating gas is maintained between 25° and 250°C.

The noble metal catalysts which are treated by the method of the instant invention are useful in many hydrocarbon conversion processes. However, in all of these processes the catalyst becomes deactivated by the deposition of carbonaceous residues on said catalyst. The carbonaceous residue may be removed from the noble metal catalyst by carefully combusting said catalyst in a limited amount of oxygen. However, even with the most carefully controlled combustion, temperature excursions occur which result in localized heating and subsequent agglomeration of the noble metal catalyst into crystallites of substantial size. It is known that catalytic activity is highly dependent upon the metal surface area and thus agglomerated noble metal catalysts display decreased activities. Certain noble metals which are utilized as hydrocarbon conversion catalysts will be present as oxides after combustion. For example, combustion of noble metal catalysts comprising ruthenium and iridium inevitably result in the formation of large oxide particles. Noble metals such as platinum, however, after combustion exist as large crystallites which are metallic.

In the prior art, reforming catalysts are regenerated by treatment with controlled amounts of oxygen to burn off carbon from the surface of the catalyst. This burn-off step is notoriously difficult to control, and temperature runaways, wherein temperatures as high as 700°C. are reached, are not uncommon. When this occurs, the carbon is, of course, substantially removed, but the particle size of the catalyst metals are undesirably increased to a very large degree.

This method of regenerating noble metal hydrocarbon conversion catalysts is especially suitable for treating reforming catalysts. Reforming catalysts, as a class, comprise one or more Group VIII noble metals, e.g. Pt, Pd, Ir, Ru and Rh, which may or may not be further combined with metals selected from the group consisting of Group IB, e.g. Ag, Cu, and Au; Group IV, e.g. Ge, Sn, and Pb; and Group VIIB, e.g. Re, supported on an inert material, for example, a refractory oxide such as alumina. Group VIII noble metal reforming catalysts may additionally comprise halogen to increase the acidity of the support and thus enhance hydrocracking activity. Particularly preferred catalysts for use in reforming comprise platinum in combination with iridium supported on an alumina support. Iridium, which is sensitive to oxygen, will after combustion form large crystallites of iridium oxide which are difficult to redisperse. The instant invention is especially suitable for redispersing iridium-type catalysts, wherein redispersion can be effected in the absence of oxygen and at low temperatures, e.g. less than 300°C. At these temperatures a further advantage is obtained, i.e. reactor corrosion problems are less serious than encountered in $Cl_2$ redispersion at 500°–600°C.

In the instant method, after the noble metal reforming catalyst has been used in a reforming process and has been deactivated by a combination of carbonaceous residues and loss of halogen, the deactivated catalyst is regenerated thus: The carbon residue is removed by combustion with small amounts of oxygen at temperatures of from 300° to 500°C. The oxygen concentration may be maintained from 0.01 volume percent to 10 volume percent, preferably from about 1 to 5 volume percent oxygen. After combustion, the catalyst, now free of carbon, is reduced in a reducing atmosphere at a temperature of 300° to 500°C. to substantially convert the noble metal oxides to their respective metals. Preferably, the reducing atmosphere comprises hydrogen gas or mixtures of $H_2$ in a diluent such as helium or $N_2$. The reduced catalyst is then treated with fluorine gas, preferably in admixture with an inert gas, such as helium, argon, nitrogen, etc. at a temperature sufficient to convert the large crystallites of metal into substantially smaller crystallites. The gas preferably comprises from 1 to 20 volume percent fluorine and the temperature is maintained at less than 300°C., more preferably, from 25° to 250°C. In this step, halogen, i.e. fluorine is also added to the support to restore the cracking activity thereof.

It has been noted in the art of redispersion of noble metal catalysts with chlorine that high temperatures and repeated cycles of contact of the noble metal catalysts with chlorine-containing gas and reducing gas are necessary. In the instant invention, which utilizes fluorine, it has been unexpectedly found that even at temperatures below 300°C. one cycle is usually sufficient to obtain greater than 80% redispersion of the metal component of the catalyst. Throughout the instant specification, dispersion was measured by X-ray diffraction. X-ray techniques indicate whether or not the metal particles of the noble metal are greater than or less than about 50 A. It has been found (see U.S. Pat. 3,147,220 above) that when the metal particle size is less than 50 A an active reforming catalyst is obtained, while metal particle sizes of greater than 50 A showed decreased reforming activity.

As noted above, the method of the instant invention restores halogen to the support as well as redispersing the noble metal component of the catalyst. In fact, it has been found that the temperature of contact must be carefully controlled to maintain the addition of halogen, e.g. fluorine, to the support at a minimum level. For example, it has been found that when temperatures of more than 300°C. are used fluorine can combine with the alumina at weights of up to 15% of said alumina. This yields a catalyst having too great of an acidity to obtain the right balance of hydrocracking, isomerization and hydrogenation activities, necessary in a reforming catalyst. Furthermore, it has been found that the use of temperatures of more than 300°C. with a fluorine gas substantially reduces the surface area of the alumina support, thus yielding a catalyst showing decreased activity. Also, since it is desirable to regenerate the catalyst in the unit in which it is used, contacting with fluorine at temperatures greater than 300°C. must be avoided to minimize the rate of reactor corrosion. Finally, it has been found that at temperatures of more than 300°C. formation of volatile fluorides of the noble metal components of the catalysts may occur. Thus, the active catalyst metal may be lost from the catalyst surface.

The contacting of the catalyst with fluorine preferably takes place under anhydrous conditions in order to minimize corrosion. It is well known, for example, that at temperatures up to 300°C. anhydrous fluorine is compatible with stainless steel. The contacting of the catalyst with the fluorine treating gas compound may be done in situ, that is in the reforming unit. In general, this contacting may take place while the catalyst is contained in a stainless steel or quartz tube laboratory reactor. Fluorine, as stated above, will be mixed with an inert gas and be present in said inert gas from a level of 1 to 20 volume percent, more preferably from 1 to 5 volume percent.

An organic fluoride may be used as a partial or total substitute for the fluorine redispersion agent in the instant method, although higher temperatures and greater concentrations are sometimes necessary. For example, organic fluoride may be advantageously used at temperatures up to about 500°C. and preferably may comprise up to 50 weight percent of the mixture with inert gas. The organic fluoride may be selected from the group consisting of organic fluorides having a sufficient vapor pressure so as to be present as a gas at the temperatures at which it is desirable to carry out redispersion. The organic fluoride redispersion agent may be selected from the group consisting of fluorocarbons and chlorofluorocarbons. Specific examples include $C_1$ to $C_6$ fluorocarbons which may be perfluorinated derivatives. Carbonyl fluoride may also be used.

When an organofluoride is substituted for fluorine, it is advantageous to include oxygen in the treating gas. Oxygen appears to act on the organofluoride to generate species which are more efficient in redispersing the metal than the organofluoride itself. Thus, when oxygen is used, the treating temperatures may be lowered. In general, the organofluorides are less preferred for use in the instant method than fluorine.

In the method of the instant invention fluorine is contacted with the catalyst at a pressure of from 0.01 to 100 atmospheres, preferably from 0.1 to 1.0 atmosphere. The time in which the fluorine is maintained in contact with the catalyst must be sufficient to provide adequate redispersion of the metal while longer times are to be avoided since fluoridation of alumina may result. In general, at lower temperatures, the time of the contact of the fluorine and the catalyst may be increased. The fluorine may be contacted with the catalyst for from 5 to 300 minutes, preferably from 30 to 60 minutes.

It has been found that even under the mild conditions taught herein the fluorine-treated catalysts undergo a reduction in surface area as measured by the BET method of from about 190 to about 140 $m^2$/gm. The catalytic consequences of this loss in surface area results in a moderate decrease in reforming activity which, however, can be tolerated in commercial operation. It has also been found that even at the moderate conditions utilized in the instant invention the fluoride content of the redispersed catalyst may be too high. In this event, the catalyst may be treated with hydrogen at a high temperature, e.g. up to 500°C. to lower the fluoride content to an acceptable level. From 1 to 3 weight percent fluorine based on the total catalyst is generally an acceptable level for use in reforming. Preferred temperatures of treatment with hydrogen to remove excess fluoride range from 300° to 500°C. It has been found that, when an organic fluoride is used in place of fluorine, no reduction in the support surface area occurs.

As stated above, high temperature treatments with fluorine gas results in the removal of the noble metal. Thus, a novel process for recovering the noble metal from the catalyst is taught herein. It is known in the art that after many regeneration cycles the noble metal content of the reforming catalysts is desirably recovered from the support and the support discarded. In the instant method, because of the tendency to reduce alumina surface area, the catalyst metal may have to be recovered on a slightly more regular basis. It has been unexpectedly found that the noble metals form volatile fluorides at temperatures of from 400° to 700°C. when contacted with a fluorine containing gas. The volatile fluoride may be recovered by lowering the temperature of the downstream gas portion of the reactor so as to collect the metal fluoride. Apparatus for recovery of volatile materials from a gas stream is known in the art. When removing iridium from the catalyst, temperatures of from 400° to 700°C. are used, for example, about 500°C.

The method of recovering the noble metal from the catalyst may be carried out in the same equipment that is used to regenerate the catalyst. The fluorine containing gas used to recover the catalyst metals will comprise from 1 to 20 volume percent fluorine, and the remainder argon, helium, nitrogen. Contacting time may vary from 5 to 300 minutes.

The following are the preferred embodiments of the present invention.

GENERAL PROCEDURES

In the following examples standard agglomerated catalysts for use in the redispersion tests were prepared by air calcining fresh reforming catalysts, comprising 0.3 weight percent each, platinum and iridium supported on alumina, (in the form of extrudates) at 538°C. for 16 hours. This procedure results in severe agglomeration of the iridium component. Prior to calcining the iridium exists as crystallites, having an average particle size of from 10 tp 20 A, while the iridium in the calcined catalyst exists as 250 to 300 A crystallites. The change in metal area of the platinum component is very little. In addition to the standard agglomerated samples a limited number of experiments were carried out with spent, regenerated reforming catalysts, i.e. catalysts which had been utilized in a reforming process until substantially deactivated, and regenerated by combustion of the carbon deposits in oxygen.

All redispersion and reduction treatments were carried out in quartz tube reactors 1 inch in diameter and 12 inches long. The experiments were generally carried out on 10–20 gm samples at one atmosphere total pressure.

The catalyst samples were normally pre-reduced with 15% $H_2$ in argon mixture at about 400°C. The reduced agglomerated catalysts were cooled to room temperature under $H_2$, flushed with $N_2$, then contacted with the treating gas mixture. The reactor was quickly brought up to the redispersion temperature and generally maintained at this temperature for 1 hour. The reactor was returned to room temperature under the treating gas and flushed with $N_2$ before removing the catalyst sample.

The percent redispersion was determined by comparing the widths and areas of the X-ray diffraction lines of the starting agglomerated catalysts (reduced and assumed to be 100% agglomerated) with those of the treated catalysts. Diffraction lines due to the $Al_2O_3$ support were employed as internal standards. Besides X-ray measurements the treated samples were also routinely submitted for % fluorine, % iridium and surface area measurements utilizing the Brunauer-Emmett-Teller (BET) method.

It should be pointed out that all redispersion experiments were single treatment, unidirectional gas flow experiments. Multistep (reduction followed by redispersion treatment) exposures and reverse flow treatments which have been shown in U.S. patent application Ser. No. 343,304 to be advantageous in the redispersion of agglomerated iridium with chlorine provides the same benefits in the instant invention.

EXAMPLE 1

The ability of fluorine-argon mixtures to redisperse agglomerated iridium under mild conditions is shown in Table I. Dilute fluorine-argon mixtures (1%) require relatively long treatment times when compared to 5% fluorine-argon mixtures to effect redispersion of iridium. At temperatures as low as 100° to 200°C. nearly 50% redispersion can be effected by a single exposure to a 5% fluorine dispersant. These temperatures are 400° to 300°C. lower than those required to produce a similar dispersion level when chlorine is employed as the dispersion agent.

As the redispersion temperature is increased from 150° to 300°C. the relative level of redispersion is found to increase. At 250°C. the amount or redispersion does not change appreciably upon increasing the reaction time from 0.5 to 1.0 hour. This result suggests that redispersion proceeds very rapidly at this temperature and is not kinetically controlled. At lower temperatures, however, the rate of redispersion is likely to show effects attributable to kinetic limitations. Without subjecting the agglomerated catalyst to a prereduction step very high redispersion temperatures are required. Even at 400°C. only 40% redispersion was produced with a 5% fluorine dispersion treatment. At these high temperatures massive fluoridating of the $Al_2O_3$ support occurs. During several high temperature experiments it was also noted that iridium could be removed from the support presumably via the formation of a volatile iridium fluoride species which escaped from the support.

TABLE I

REDISPERSION OF AGGLOMERATED (Pt/Ir) REFORMING CATALYSTS WITH FLUORINE-ARGON MIXTURES

| Experiment Number | Pre-Reduction Conditions[a] | | | Redispersion Conditions[b] | | | | Redispersion[c] (%) |
|---|---|---|---|---|---|---|---|---|
| | T (°C) | t (hr) | Rate (cc/min) | T (°C) | t (hr) | Conc (%) | Rate (cc/min) | |
| Standard Agglomerated Catalysts[d] | | | | | | | | |
| 19 | 400 | 1.0 | 500 | — | — | — | — | 0 |
| 19-1 | — | — | — | 300 | 3.0 | 1.0 | 500 | 0 |
| 19-3 | 400 | 1.0 | 500 | 300 | 16 | 1.0 | 150 | 64 |
| 67-1 | 400 | 1.0 | 540 | 150 | 1.0 | 5.0 | 520 | 43 |
| 67-2 | 400 | 1.0 | 520 | 175 | 1.0 | 5.0 | 540 | 52 |
| 67-3 | 400 | 1.0 | 540 | 200 | 2.0 | 5.0 | 520 | 93 |
| 20 | 400 | 0.5 | 500 | 250 | 0.5 | 5.0 | 500 | 83 |
| 72-1 | 400 | 1.0 | 600 | 250 | 1.0 | 5.0 | 500 | 88 |
| 74-3 | 400 | 1.0 | 600 | 250 | 1.0 | 5.0 | 520 | 91 |
| 26 | 400 | 1.0 | 500 | 300 | 1.0 | 5.0 | 520 | 100 |
| 67-4 | 400 | 1.0 | 580 | 315 | 1.0 | 5.0 | 520 | 86 |
| 27 | — | — | — | 400 | 1.0 | 5.0 | 500 | 40 |
| Spent Regenerated Catalysts[e] | | | | | | | | |
| 72-2 | 400 | 1.0 | 600 | 250 | 1.0 | 5.0 | 520 | 100 |
| 74-1 | 400 | 1.0 | 590 | 275 | 1.0 | 5.0 | 540 | 100 |

[a]Reductant mixture was 15% H₂ in argon.
[b]Redispersion fluorine-argon agents were premixed.
[c]% redispersion was calculated by comparative X-ray measurements.
[d]Standard agglomerated catalysts were prepared by air calcining reforming catalysts at 538°C. for 16 hrs.
[e]Spent reforming catalysts had been regenerated as described above.

In view of the corrosion arguments presented above the optimum redispersion temperature with fluorine for a single treatment procedure is around 200°C. If multi-step treatments are employed it is possible to effect high dispersion levels at temperatures as low as 100°C. These lower reaction temperatures will cause less surface area damage to the $Al_2O_3$ support. Surface area damage has been found to result from the incorporation of large quantities of fluorine at high reaction temperatures.

EXAMPLE 2

Redispersion of Agglomerated (Pt/Ir) Reforming Catalysts with Fluorinated Carbon Compounds CF₄-Argon Mixtures as Dispersion Aids The results of experiments employing $CF_4$-argon mixtures as redispersion agents are presented in Table II. Although the redispersion level effected by a single exposure to $CF_4$ is considerably lower than that given by fluorine the use of organofluorides show certain advantages. Higher temperatures are required with $CF_4$ than with fluorine and is most probably a reflection of the energy differences required to break the C-F (120 kcal/mole) and F-F (37 kcal/mole) bonds. The homolytic cleavage of C-F and F-F bonds produces atomic fluorine and it is this species which is believed to be the active fluorinating (redispersion) agent. Higher dispersion levels employing $CF_4$ can be achieved by using multistep treatments and lower space velocities.

EXAMPLE 3

Fluoriding of the $Al_2O_3$ Support

Upon addition of 5% fluorine to agglomerated, reduced reforming catalysts at room temperature an exotherm of approximately 75° to 100°C. is observed. An exotherm of the same magnitude is also observed with an alumina support reduced under the same conditions as the reforming catalyst. These exotherms are associated with the fluoridation of the alumina support. Dilute fluorine (1%) argon mixtures do not produce exotherms of such magnitude. The somewhat deleterious effects of fluorine on reforming catalysts are outlined in Table III. The data clearly suggests that to minimize the uptake of fluorine one should operate at relatively low redispersion temperatures (250°C. and lower) and short reaction times (compare experiments 20 and 72-1). Unlike chlorine treatments, fluorine breakthrough at a given set of reaction conditions is not a good cut-off point for the redispersion treatment as massive fluorination of the alumina support may result.

The fluorine treated catalysts undergo a reduction in BET surface area from around 190 to 140–120 m²/gm. The catalytic consequences of the loss in surface area due to fluoride results in a moderate decrease in reforming activity. A small amount of oxygen in conjunction with the fluorine treat lowers the uptake of fluoride. A high temperature hydrogen reduction step (500°C.) following fluorine treatment may also be utilized to reduce the fluoride content of the redispersed catalysts to an acceptable level. In the case of redispersion with $CF_4$ argon mixtures no reduction in the catalyst surface area occurred.

TABLE II

REDISPERSION OF AGGLOMERATED[a] (Pt/Ir) REFORMING CATALYSTS WITH FLUORINATED CARBON COMPOUNDS

| Experiment Number | Pre-Reduction Conditions[b] | | | Redispersion Conditions[c] | | | | Redispersion[d] (%) |
|---|---|---|---|---|---|---|---|---|
| | T (°C) | t (hr) | Rate (cc/min) | T (°C) | t (hr) | Conc (%) | Rate (cc/min) | |
| Redispersion Agent CF₄ | | | | | | | | |
| 78-1 | 416 | 1.0 | 600 | 350 | 1.0 | 10 | 600 | 17 |
| 78-2 | 410 | 1.0 | 600 | 420 | 1.5 | 10 | 600 | 15 |

[a]Standard agglomerated catalysts were prepared by air calcining reforming catalysts at 538°C. for 16 hours.
[b]Reductant mixture was 15% H₂ in argon.
[c]Redispersion mixtures were premixed.
[d]% redispersion was calculated by comparative X-ray measurements.

TABLE III

UPTAKE OF FLUORINE BY AGGLOMERATED[a] (Pt/Ir) REFORMING CATALYSTS DURING REDISPERSION STUDIES WITH FLUORINE AND $CF_4$

| Experiment Number | Redispersion Conditions[b] | | | Redispersion (%)[c] | Fluorine Uptake (%)[d] | SA[e] ($m^2$/gm) |
|---|---|---|---|---|---|---|
| | T (°C) | T (hr) | Rate (cc/min) | | | |
| *5% Fluorine in Argon as Dispersion Aid* | | | | | | |
| Blank | — | — | — | — | 0.0 | 194 |
| 67-1 | 150 | 1.0 | 520 | 43 | — | 139 |
| 67-2 | 175 | 1.0 | 540 | 52 | — | 140 |
| 67-3 | 200 | 1.0 | 520 | 93 | 5.46 | 112 |
| 20 | 250 | 0.5 | 500 | 83 | 0.7 | — |
| 72-1 | 250 | 1.0 | 500 | 88 | 9.89 | 115 |
| 67-4 | 315 | 1.0 | 520 | 86 | 10.56 | 125 |
| 74-2[f] | 275 | 1.0 | 540 | — | 16.17 | 119 |
| *10% $CF_4$ in Argon as Dispersion Agent* | | | | | | |
| 78-1 | 350 | 1.0 | 600 | 17 | — | 191 |
| 78-2 | 420 | 1.5 | 600 | 15 | — | 187 |

[a] Standard agglomerated catalysts were prepared by air calcining reforming catalysts at 538°C. for 16 hours. Prior to redispersion treatment the catalysts were reduced in hydrogen at 400°C.
[b] Redispersion agents were premixed.
[c] % redispersion was calculated by comparative X-ray measurements.
[d] Wet chemical analyses.
[e] Surface (SA) measurements were determined by the BET method employing argon.
[f] $Al_2O_3$ support no metals present

EXAMPLE 4

Retention of Iridium During Fluorine Treatments

The fluorine treated catalysts were analyzed for iridium content by comparative (fresh reforming catalyst) neutron activation analyses. In experiments carried out at 150° to 315°C. no loss in iridium via the escape of volatile iridium fluoride complexes was detected. During high temperature treatments, 400°C. and higher, an iridium mirror was formed on the cool downstream side of the quartz reaction tube. This result demonstrates that high temperature fluorine treatments may be used for recovering iridium and other precious metals from supports via the formation of volatile metal fluoride complexes. This fluorine recovery scheme may be advantageously compared to the present recovery techniques which require digestion and lengthy quantitative analyses procedures to recover iridium and other precious metals from spent catalysts.

What is claimed is:

1. A method for regenerating a hydrocarbon conversion catalyst which comprises iridium supported on a refractory inorganic oxide support, and which is at least partially deactivated by the presence of carbonaceous deposits thereon which comprises, serially, the steps of
   1. contacting said catalyst with an oxygen-containing gas at a temperature of at least 300°C. for a time sufficient to burn at least a substantial portion of said carbonaceous deposits from said catalyst and thereby converting at least a portion of said iridium into large particle size oxide crystallites;
   2. contacting said catalyst with a reducing gas at an elevated temperature for a time sufficient to convert at least a portion of said iridium oxide into the metal;
   3. contacting said catalyst with a gaseous dispersing agent comprising fluorine and an inert gas at a temperature of from between 25° and 250°C. for a time sufficient to redisperse said large crystallites to crystallites having a substantially smaller size to effect at least 43% redispersion but insufficient to volatize the iridium or to substantially reduce the surface area of the support.

2. The method of claim 1 wherein said catalyst is a reforming catalyst.

3. The method of claim 1 wherein said support is alumina.

4. The method of claim 3 wherein said iridium containing catalyst additionally contains a metal selected from the group consisting of Groups IB, IV, VIIB and the noble and nonnoble metals of Group VIII of the Periodic Table of the Elements.

5. The method of claim 3 wherein the iridium containing catalyst additionally contains platinum.

6. The method of claim 1 wherein the volume percent of said fluorine is from about 1 to about 20.

* * * * *